G. WAGNER.
VARIABLE SPEED GEARING.
APPLICATION FILED JULY 15, 1909.
1,003,221.
Patented Sept. 12, 1911.
3 SHEETS—SHEET 1.
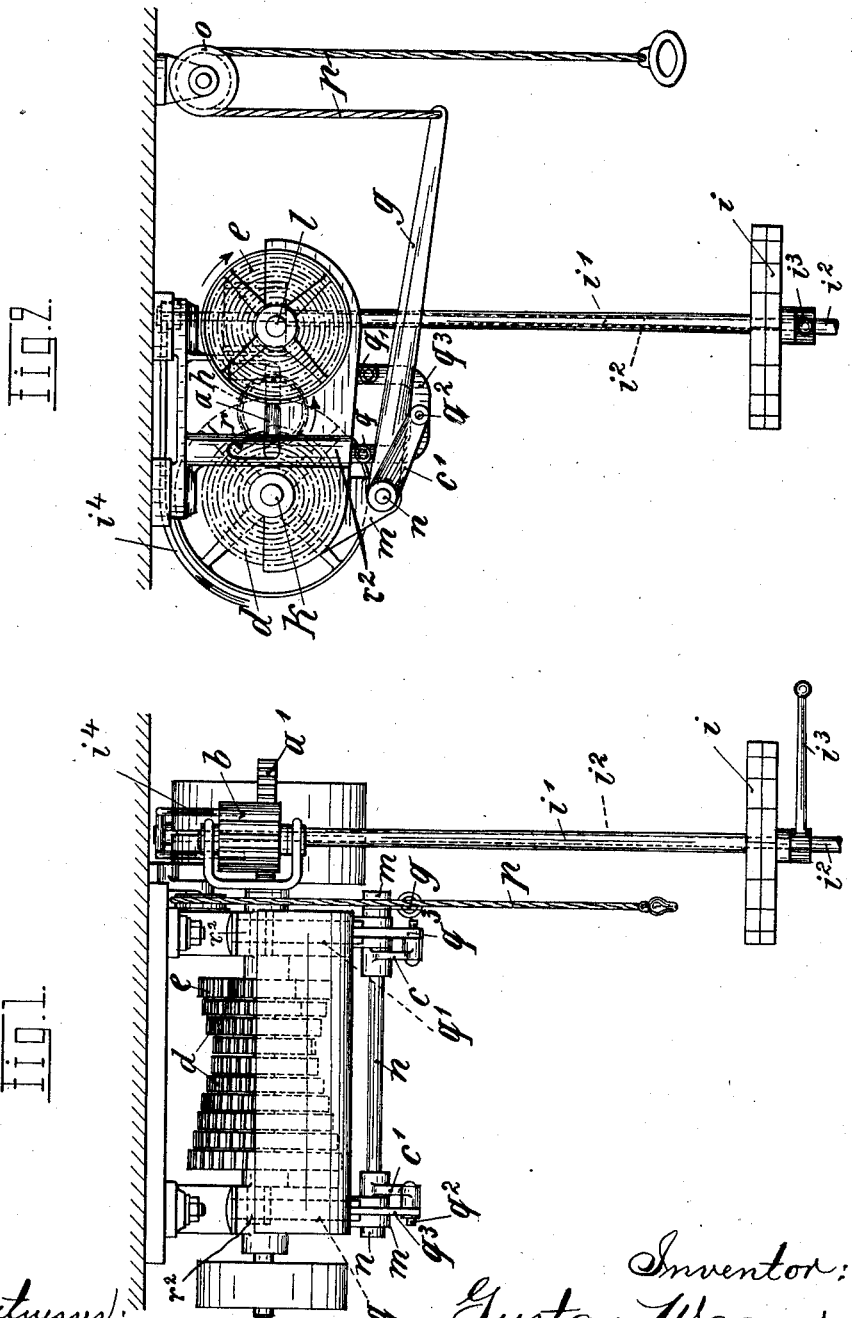

G. WAGNER.
VARIABLE SPEED GEARING.
APPLICATION FILED JULY 15, 1909.
1,003,221.
Patented Sept. 12, 1911.
3 SHEETS—SHEET 2.
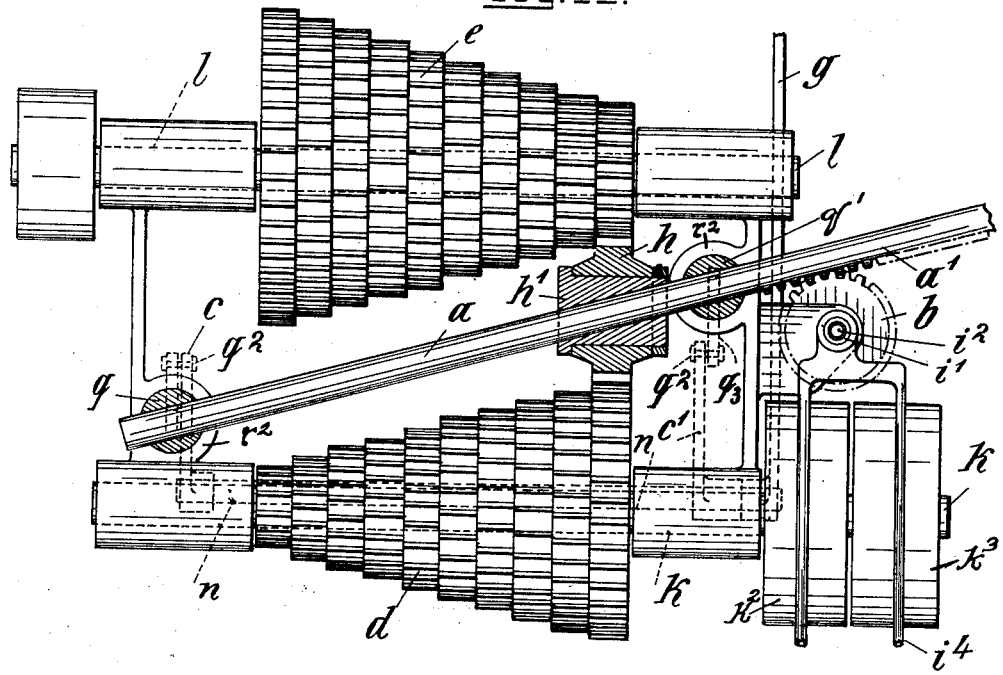
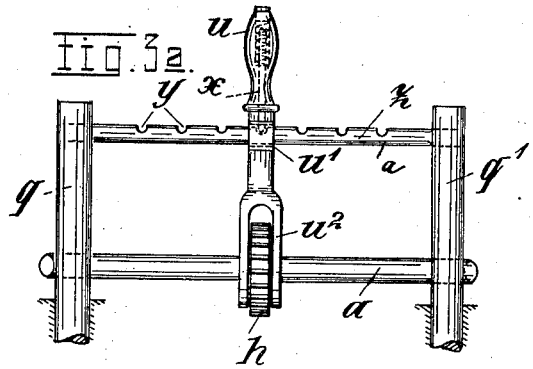
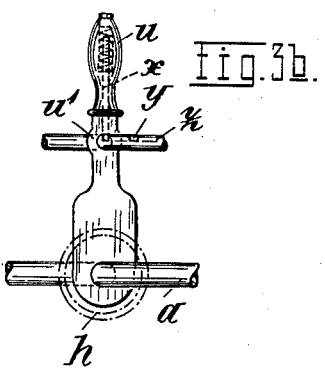
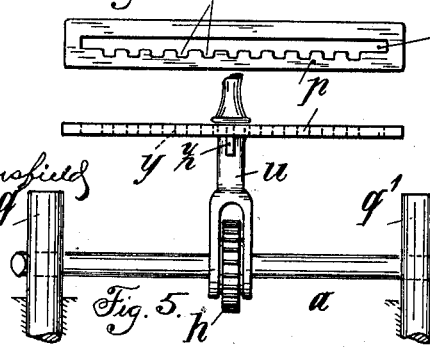
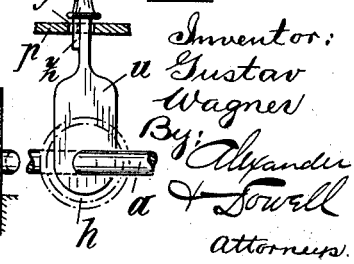
Witnesses:
James B. Mansfield
L. E. Witham
Inventor:
Gustav Wagner
By Alexander & Dowell
Attorneys G. WAGNER.
VARIABLE SPEED GEARING.
APPLICATION FILED JULY 15, 1909.
1,003,221.
Patented Sept. 12, 1911.
3 SHEETS—SHEET 3.
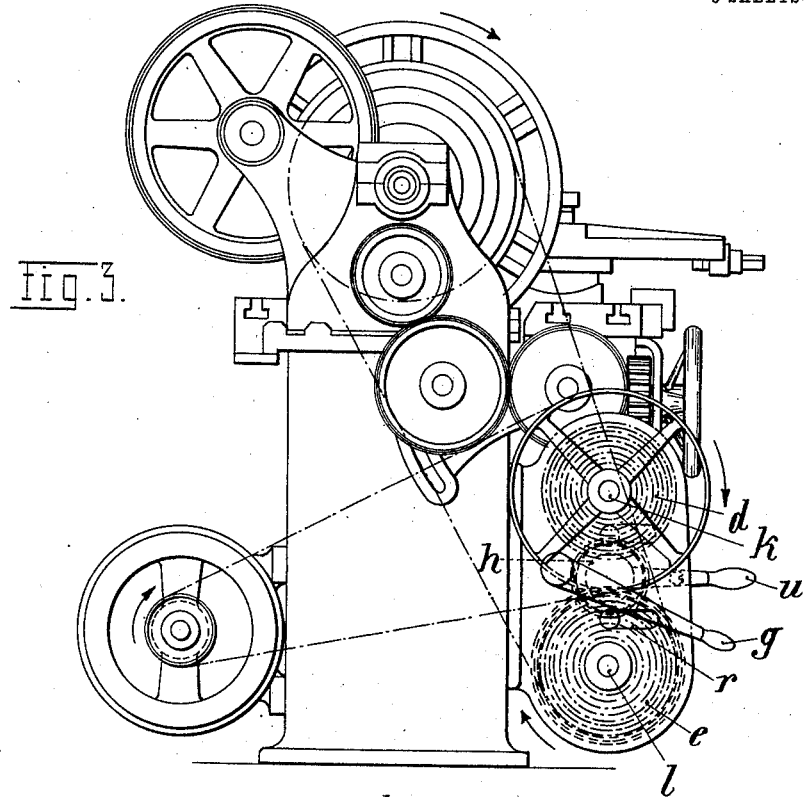
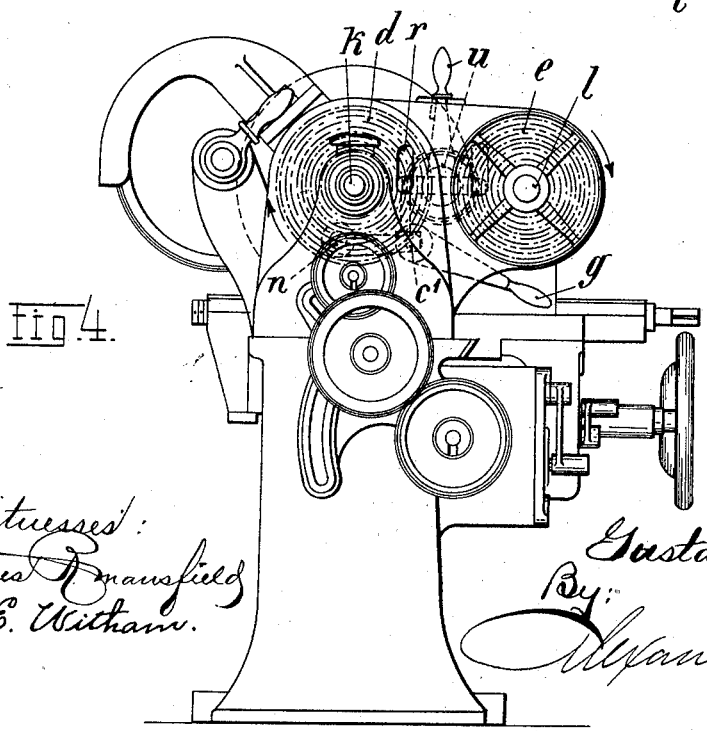

UNITED STATES PATENT OFFICE.

GUSTAV WAGNER, OF REUTLINGEN, GERMANY.

VARIABLE-SPEED GEARING.

1,003,221.　　　　　Specification of Letters Patent.　　Patented Sept. 12, 1911.

Application filed July 15, 1909. Serial No. 507,759.

*To all whom it may concern:*

Be it known that I, GUSTAV WAGNER, a subject of the King of Wurttemberg, and resident of Reutlingen, Germany, have invented certain new and useful Improvements in Variable-Speed Gearing, of which the following is a specification.

This invention relates to variable speed gearing and it consists in the novel construction and combination of parts hereinafter described and claimed.

In the accompanying drawings: Figure 1 is a side elevation of the preferred form of the gearing. Fig. 2 is an end view thereof. Fig. 1$^a$ is a detail top plan view thereof, partly in section, and on an enlarged scale. Fig. 3 is an end elevation of a machine equipped with a modified form of the invention. Figs. 3$^a$ and 3$^b$ are detail views of parts indicated in Fig. 3. Fig. 4 is an end elevation of a machine equipped with another modification of the invention; and Fig. 5 is a detail view of the devices for adjusting the intermediate gears shown in Fig. 4. Fig. 6 is a detail plan view of the plate $p$, Fig. 5. Fig. 7 is a sectional view of Fig. 4.

The gearing comprises a pair of parallel but oppositely disposed conical or stepped gears $d$, $e$, respectively mounted on a driving the shaft $l$ and a driven shaft $k$. An intermediate gear $h$ adapted to mesh with both gears $d$, $e$, is rotatably mounted on a bushing $h'$ lying parallel with shafts $k$, $l$, and slidably supported on an adjustable bar $a$ which lies oblique to the shafts $k$, $l$, and intermediate gears $d$, $e$, in such a manner that by disengaging gear $h$ from gears $d$, $e$, and then moving the bar $a$ longitudinally the intermediate gear $h$ can be shifted to any desired position between the steps of the gears $d$, $e$. The bar $a$ can be moved longitudinally by means of a rack $a'$, on one end of the bar, meshing with a pinion $b$ on the end of an operable shaft $i'$, as hereinafter explained.

The bar $a$ is slidably mounted in slides $q$, $q'$ which, as shown in Figs. 1 and 2, are mounted in vertical sleeves $r^2$ in the frame in which the shafts $l$, $k$, are journaled. These sleeves $r^2$ are provided with slots $r$ through which the ends of bar $a$ can project, and which permit the bar $a$ to be moved laterally by moving the slides $q$, $q'$. Said slides are connected, at their lower or outer ends, by means of bent pivoted links $q^3$ to arms $c$, $c'$ respectively attached to a rockshaft $n$ journaled in hangers $m$ attached to the frame of the apparatus. To the rockshaft $n$ is fastened a lever $g$ which can be operated in any suitable manner so as to rock shaft $n$ and thus raise and lower the slides $q$, $q'$. As shown a rope $p$ is attached to the outer end of lever $g$ and extends over a pulley $o$ to a point within easy reach of the operator.

Normally the parts are in the position indicated in Fig. 2 with the bar $a$ in such position that the intermediate gear $h$ is in mesh with the stepped gears $d$, $e$. If it is desired to shift the intermediate gear $h$, the bar $a$ is moved laterally by pulling on rope $p$, so as to disengage gear $h$ from both gears $d$, $e$. The operator then rotates pinion $b$ by means of a hand-wheel $i$, or other suitable device on the lower end of shaft $i'$, so as to shift the bar $a$ lengthwise and move gear $h$ to the desired position lengthwise of the gears $d$, $e$; he then releases the rope $p$ which permits bar $a$ to move laterally toward gears $d$, $e$ and causes gear $h$ to engage the opposed faces of the stepped gears $d$, $e$ at the desired point. The weight of the bar $a$ and the parts connected therewith is ordinarily sufficient to hold the gear $h$ in meshed position.

The hand-wheel $i$ may be provided with a scale or indicator to enable the attendant to readily shift gear $h$ to the desired position for causing any desired number of revolutions of the driven shaft; and the hand-wheel $i$ may be secured by any suitable means when adjusted. The pinion $b$ is long enough to enable the bar $a$ and rack $a'$ to be shifted laterally, as required, without disengaging the rack from the pinion.

The driven shaft $k$ may be provided with fast and loose pulleys $k^2$, $k^3$, and in order to shift the belt from the fast to the loose pulley, when the gear $h$ is to be adjusted, a belt shifter $i^4$ may be attached to a rod $i^2$, that extends through the hollow shaft $i'$, and is provided on its lower end with an adjusting lever $i^3$, and the operator by partially turning the rod $i^2$ can shift the belt on to either the fast or loose pulley, and should adjust it onto the loose pulley before attempting to shift the intermediate gear $h$.

Where the variable speed gearing is to be used directly on the machine as indicated in Figs. 3 and 4 the devices for shifting the gear $h$ may be slightly modified as follows: In the construction illustrated in Fig. 3ª the bar $a$ is fixedly mounted in the slides $q$, $q'$, which can be shifted either indirectly, by the means illustrated in Figs. 1 and 2, or directly by hand. In the latter case the slides $q$, $q'$ are connected by a cross-bar $z$ (Fig. 3ª) which is provided with a number of notches $y$ corresponding with the number of steps in the gears $d$, $e$. On this cross-bar is a sliding hand-lever $u$, (which is guided thereon by means of the eye $u'$) having a fork $u^2$ embracing the gear $h$, so that by shifting lever $u$ the gear can be shifted upon the bar $a$. The hand-lever $u$ is provided with a catch $x$ adapted to engage any one of the notches $y$ of the cross-bar $z$. In order to adjust the gear $h$ the slides $q$, $q'$, are first drawn out, by pulling on the hand-lever $u$, so as to disengage gear $h$ from gears $d$, $e$. Then gear $h$ is moved along the bar $a$ by means of the hand-lever, to the desired position and is secured by the stop-pin $x$ engaging the proper notch $y$. Then the slides are moved inward until gear $h$ reëngages the stepped gears $d$, $e$.

In the form of construction illustrated in Figs. 5, 6, 7, hand-lever $u$ is guided in a slot $o$ in a plate $p$ fastened on the frame of the machine. This slot $o$ has a number of notches $y$ in one side corresponding with the number of steps on gears $d$, $e$, and lever $u$ is locked in adjusted position by engaging the lug $z$ thereon with one of the notches $y$. To adjust the intermediate gear the lever is disengaged from one of the notches $y$ by a pull, which at the same time moves the gear $h$ out of mesh with the stepped gears $d$, $e$; the gear is then shifted on the bar $a$ to the desired position, and locked therein by pushing the lever $u$ inward, which at same time moves gear $h$ back into mesh with gears $d$, $e$.

Having described my invention what I claim as new and desire to secure by Letters Patent thereon is:

1. In variable speed gearing, the combination of parallel driven and driving shafts, opposite stepped gears on said shafts, slides located intermediate said shafts, a bar supported in said slides, an intermediate gear mounted on said bar and adapted to mesh with the opposite stepped gears, means for shifting said slides so as to move the bar laterally and carry the said intermediate gear into or out of mesh with the stepped gears, and means for shifting the intermediate gear longitudinally of the stepped gears while it is disengaged therefrom.

2. In variable speed mechanism, the combination of parallel driven and driving shafts, opposite stepped gears on said shafts, slides located intermediate said shafts adjacent the ends of the stepped gears, a bar slidably supported in said slides, an intermediate gear mounted on said bar and adapted to mesh with the opposite stepped gears, manually operable means for shifting said slides so as to move the bar laterally to carry said intermediate gear into or out of mesh with the stepped gears, and manually operable means for moving said bar longitudinally while the intermediate gear is disengaged so as to shift the intermediate gear longitudinally of the stepped gears.

In testimony whereof I have signed my name to this specification in the presence of two subscribing witnesses.

GUSTAV WAGNER.

Witnesses:
 WOLDEMAR HAUPT,
 HENRY HASPER.

---

Copies of this patent may be obtained for five cents each, by addressing the "Commissioner of Patents, Washington, D. C."